United States Patent [19]

Podolak

[11] Patent Number: 5,438,594
[45] Date of Patent: Aug. 1, 1995

[54] DEVICE FOR DEMODULATING DIGITAL SIGNALS MODULATED BY AN ALTERNATING MODULATION CONSTELLATION TECHNIQUE

[75] Inventor: Thierry Podolak, Levallois-Perret, France

[73] Assignee: Societe Anonyme dite Alcatel Telspace, Nanterre Cedex, France

[21] Appl. No.: 41,967

[22] Filed: Apr. 2, 1993

[30] Foreign Application Priority Data

Apr. 3, 1992 [FR] France ................................ 92 04101

[51] Int. Cl.⁶ .......................... H03D 3/22; H04L 27/22
[52] U.S. Cl. ...................................... 375/332; 329/304; 329/306; 375/327; 375/333; 375/344
[58] Field of Search ........................ 375/52, 53, 54, 83, 375/85, 86, 97; 329/304, 306, 307, 308, 309

[56] References Cited

U.S. PATENT DOCUMENTS

| | | | |
|---|---|---|---|
| 3,983,499 | 9/1976 | Tan . | |
| 4,344,178 | 8/1982 | Waters | 329/308 |
| 5,179,578 | 1/1993 | Ishizu | 375/54 |

FOREIGN PATENT DOCUMENTS 2240674  8/1991  United Kingdom .

OTHER PUBLICATIONS

40th IEEE Vehicular Technology Conference, 6–9 May, 1990, Orlando, US; IEEE, New York, US, 1990; pp. 687–694, Goode, et al.; "A comparison of limiter–discriminator, delay and coherent detection of pi/4 QPSK".

Primary Examiner—Stephen Chin
Assistant Examiner—William Luther
Attorney, Agent, or Firm—Sughrue, Mion, Zinn, Macpeak & Seas

[57] ABSTRACT

A device for demodulating a signal modulated on two axes in phase quadrature using a $\pi/4$-QPSK type digital modulation technique employing alternately two phase-shifted constellations. The device includes: a voltage-controlled oscillator (28) supplying a local signal substantially at the carrier frequency; a demodulator means using the local signal and supplying, after filtering (30, 31), the phase component P and quadrature component Q of the demodulated received signal; a phase controller (32) producing a control signal (39) for controlling the oscillator (28) and including a phase estimator (33) producing a phase estimation signal E (35) involved in control of the oscillator (28), the phase estimation signal being derived from the phase component P and quadrature component Q of the demodulated received signal. The phase controller has an inverter (34) for alternately inverting the polarity of the phase estimation signal E (35) at the rate at which the constellations alternate supplying the control signal (39) for controlling the oscillator (28) after filtering (29) in the loop.

6 Claims, 3 Drawing Sheets

DEVICE FOR DEMODULATING DIGITAL SIGNALS MODULATED BY AN ALTERNATING MODULATION CONSTELLATION TECHNIQUE

The invention concerns the demodulation of digital signals coded by modulation using two relatively phase-shifted modulation constellations selected alternately, i.e. $\pi/4$ shifted Quaternary Phase Shift Keying ($\pi/4$-QPSK).

$\pi/4$-QPSK modulation is widely used in the radiotelephone art. It has been selected for the North American and Japanese digital cellular radiotelephone standards and for the new European TSTS standard for airborne digital radiotelephones.

The general principle of $\pi/4$-QPSK modulation is that of conventional modulation using four phase states (QPSK modulation), with the modulation constellation alternately phase-shifted by $\pi/4$. The transitions between symbols are such that amplitude modulation is more limited than in conventional QPSK modulation.

A conventional method of demodulating a signal of this kind is to treat it as if it were modulated using eight phase states. An 8PSK Costas loop demodulator is used, for example. These demodulators are much more complex and therefore more costly than QPSK demodulators.

Demodulation techniques specific to $\pi/4$-QPSK modulation have also been developed, as disclosed in British patent application No 2 240 674 filed 23 Jan. 1991, for example.

This document describes three types of demodulator with the common objective of phase-shifting the received signal constellation by $\pi/4$ on alternate symbols, after demodulation.

In other words, these demodulators comprise a conventional Costas loop for demodulating QPSK signals which is used to slave a voltage-controlled oscillator driving two multipliers supplying phase and quadrature demodulated signals. The alternate phase-shifting by $\pi/4$ is applied to the demodulated signals using a specific phase-shifter module (FIG. 4 of the document GB 2 240 674), a transcoding table (FIG. 9) or a voltage-controlled oscillator operating at four times the frequency of the Costas loop (FIG. 11).

These three techniques have a drawback in that one or more complex and therefore costly devices (phase-shifter circuit, read only memory or phase-locked loop, etc.) must be added to the prior art Costas loop systems.

One object of the invention is to alleviate these drawbacks of the prior art.

One specific object of the invention is to provide a device for demodulating signals modulated using a $\pi/4$-QPSK type alternately selected relatively phase-shifted modulation constellation technique which is simple and of low cost as compared with prior art demodulators for modulation using the same number of phase states, but with no constellation phase-shift, and which does not require the addition of any complex devices to the prior art Costas loop devices.

Another object of the invention is to provide a demodulator device of this kind which is as rugged as prior art Costas loop devices.

These objects, and others that will emerge hereinafter, are achieved by virtue of a device for demodulating a received signal at a carrier frequency modulated on two axes in phase quadrature using a $\pi/4$-QPSK type digital modulation technique employing two modulation constellations with four alternately selected and relatively shifted phase states, of the type comprising:

a voltage-controlled oscillator supplying a local signal substantially at said carrier frequency, demodulator means using the local signal and supplying, after filtering, the phase component P and quadrature component Q of the demodulated received signal, phase control means producing a control signal for controlling the oscillator and including a phase estimator producing a phase estimation signal E satisfying substantially the condition:

$$E(o+\pi/4) = -E(o) \quad (1)$$

where:

$$\cos\phi = \frac{P}{\sqrt{P^2 + Q^2}} \text{ and } \sin\phi = \frac{Q}{\sqrt{P^2 + Q^2}}$$

and involved in control of the oscillator, the phase estimation signal E being derived from the phase component P and quadrature component Q of the demodulated received signal.

According to the invention the phase control means comprise means for alternately inverting the polarity of the phase estimation signal E at the same rate as the constellations alternate supplying the control signal for the oscillator.

The means for alternately inverting the polarity of the phase estimation signal E at the same rate as the constellations alternate are advantageously controlled by a polarity inversion signal I whose sign is alternately positive and negative, each transition of the inversion signal being in substantially corresponding relationship to a transition between two consecutive symbols of the digital signal.

The polarity inversion signal I may be obtained by halving the frequency of a clock signal at the digital signal symbol frequency.

The means for alternately inverting the polarity of the phase estimation signal advantageously comprise a multiplier receiving the polarity inversion signal and the phase estimation signal E.

The invention is applicable if the phase estimator supplies a phase estimation signal E defined by either of the following expressions:

$$E = (P).(Q).(P+Q).(P-Q) \quad (2)$$

$$E = sgn(P).sgn(Q).sgn(P+Q).sgn(P-Q) \quad (3)$$

in which sgn(.) is an operator supplying the sign of the signal (.) in question.

Other similar or equivalent estimators satisfying condition (1) may be used instead, of course.

Other features and advantages of the invention will emerge from the following description of a preferred embodiment given by way of non-limiting illustrative example only and the appended drawings in which:

FIG. 1A shows the set of states constituting the $\pi/4$-QPSK modulation constellation in the plane defined by the phase component axis P and the quadrature component axis Q.

The signal can thus assume eight distinct states $11_1$ through $11_4$ and $12_1$ through $12_4$ which are equi-angularly spaced by $\pi/4$.

This constellation is that used in conventional 8-PSK modulation. It is thus evident that $\pi/4$-QPSK modulation can be demodulated using an 8-PSK demodulator. A demodulator of this kind is under-used, however. It must have a discrimination capability of $\pi/4$ (the angle between any two possible consecutive states), whereas a discrimination of $\pi/2$ is sufficient in $\pi/4$-QPSK modulation. It follows that using an 8-PSK demodulator for $\pi/4$-QPSK modulation represents unnecessary complexity.

In $\pi/4$-QPSK modulation the signal can assume one of only four distinct phase states at a given time, separated by $\pi/2$. At time t, for example, the constellation is as constellation 1, comprising the states $11_1$ through $11_4$. At the time of the next symbol the signal can assume any one of the four states $12_1$ through $12_4$ of a constellation 2 shifted $\pi/4$ relative to constellation 1.

This alternate shifting has many advantages, especially with regard to the transitions between two consecutive states.

Figure 1A:
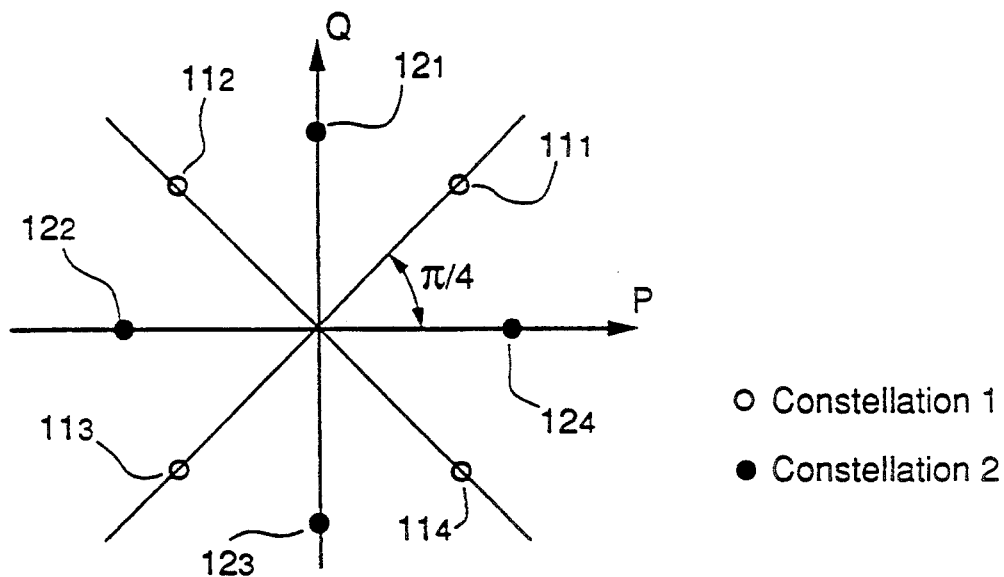
FIGS. 1A, 1B and 1C show the principle of $\pi/4$-QPSK modulation.
Figures 1B, 1C:
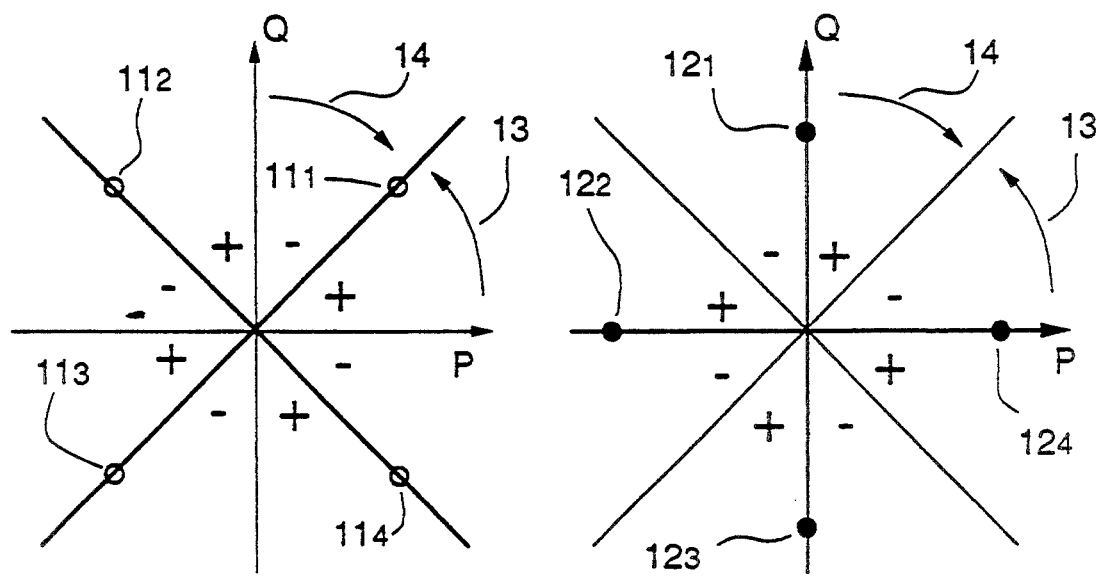

FIGS. 1B and 1C respectively show constellation 1 active and constellation 2 active. These figures clearly show that at any given time these constellations are equivalent to a conventional QPSK constellation.

The invention is therefore directed to enabling demodulation of $\pi/4$-QPSK signals using demodulator means known in the prior art for QPSK demodulation, and specifically the Costas loop. To be more precise, the invention proposes a simple and low-cost improvement to the QPSK Costas loop to make it suitable for $\pi/4$-QPSK demodulation without compromising its ruggedness.

A Costas loop conventionally comprises a voltage-controlled oscillator producing a local signal at a frequency substantially equal to the received signal carrier frequency in order to enable phase demodulation of the latter, the local oscillator being controlled by a control signal derived from a phase estimator.

The phase estimator supplies data tending to shift the demodulated signal towards one of the stable equilibrium phases of the constellation. Referring again to FIG. 1B, the phase estimator supplies a signal whose sign, represented by the symbols "+" and "−", depends on the position of the demodulated symbol and whose effect is to rotate the demodulated signal constellation in the respective rotation direction 13 or 14 by appropriate action on the phase of the voltage-controlled oscillator.

In this way the demodulated signal is always shifted to the nearest stable equilibrium phase.

The Costas loop phase estimator may employ various prior art equations, for example:

$E = P.Q.(P+Q).(P-Q)$ $E = sgn(P).sgn(Q).sgn(P+Q).sgn(P-Q)$ $E = P.sgn(Q) - Q.sgn(P)$ where sgn( ) is the function supplying the sign of the signal in question.

It is evident that an estimator of this kind may not be used directly on $\pi/4$-QPSK modulation. Looking at FIGS. 1B and 1C together, it can be seen that the stable equilibrium phases are alternately shifted ($11_1$ through $11_4$, FIG. 1B then $12_1$ through $12_4$, FIG. 1C), so that the estimator signs must vary accordingly.

The invention proposes a particularly simple solution to this problem based on the observation that the signs of the phase estimation signals are opposite in the respective constellations.

According to the invention, therefore, the conventional phase estimation signal is modified by providing means for inverting the signal supplied by the estimator regularly, on alternate symbols. In this way the oscillator control signal will always relate to the phase estimation signal for the active constellation.

Figure 2:
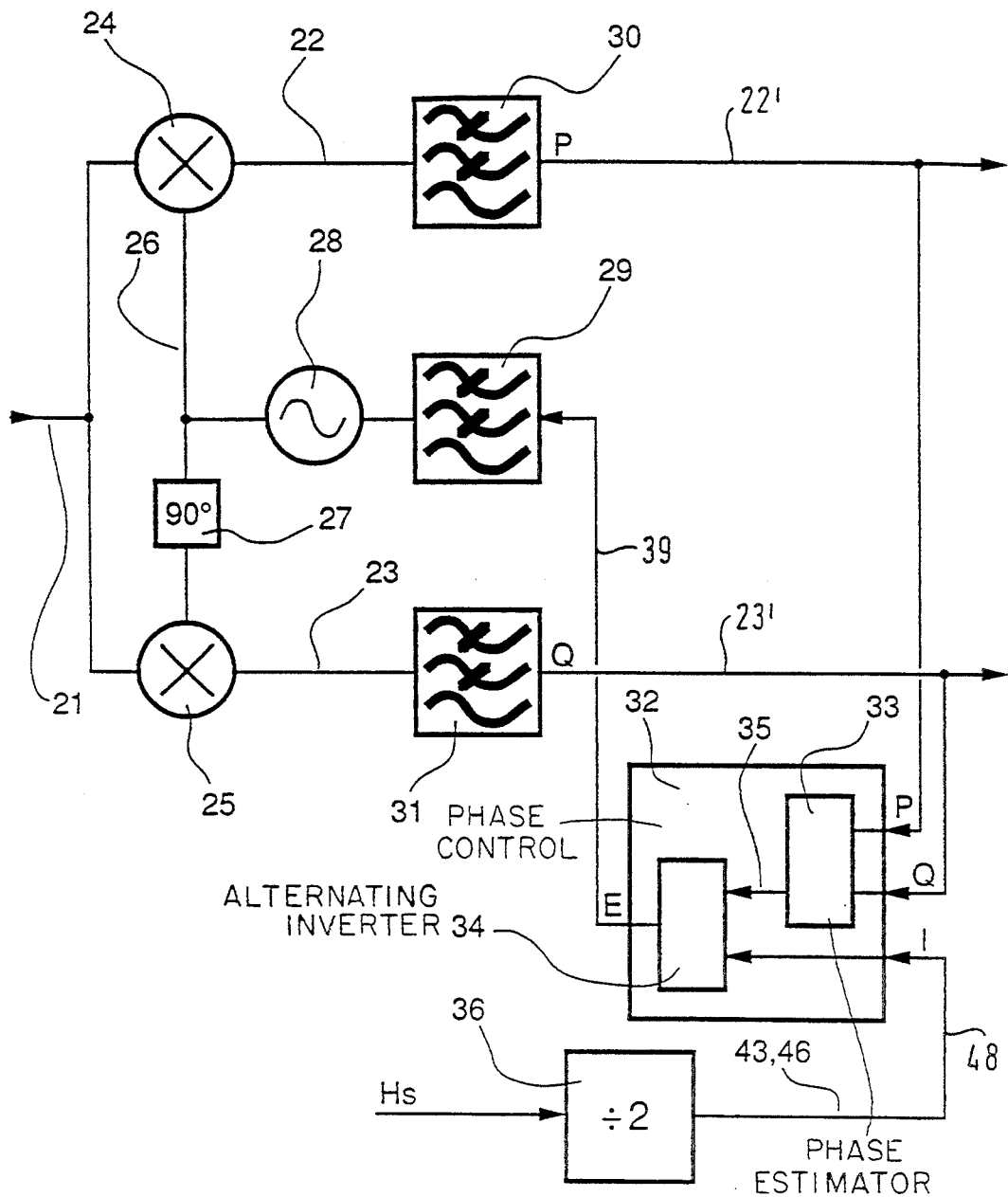
FIG. 2 is a block diagram of a demodulator device in accordance with the invention.

FIG. 2 is a block diagram of a demodulator in accordance with the invention.

The received modulated signal 21 is simultaneously phase demodulated 22 and quadrature demodulated 23 by means of two multipliers 24 and 25 producing the product of the received signal 21 with a local signal 26 at the carrier frequency phase-shifted 90° by a phase-shifter 27 in the case of the quadrature channel 23.

This local signal at the carrier frequency 26 is supplied by a voltage-controlled oscillator 28 controlled by a control signal 39 after low-pass loop filtering 29.

Likewise the demodulated signals 22 and 23 are filtered by respective low-pass filters 30 and 31 to provide the phase P and quadrature Q signals 22' and 23'.

The invention resides in the phase control means 32 containing the phase estimator 33. The phase control means 32 are responsive not only to the demodulated signals 22' and 23' but also to a polarity inversion signal I 48 which tracks the shifting of the modulation constellations.

The sign of the signal I 48 is alternately positive and negative at the clock rate Hs at which the symbols arrive which is substantially constant throughout the duration of each symbol.

In more detail, the phase control means 32 in accordance with the invention may be regarded as the combination of a conventional estimator 33 supplying an estimation signal 35 coupled to means 34 for alternately inverting the estimation signal 35 controlled by the signal 48.

In practise the estimator 33 supplies the following phase estimation signal E (35), for example:

$E = (P).(Q).(P+Q).(P-Q).$

In another embodiment the estimator 33 calculates the phase estimation signal E (35) as follows:

$E = sgn(P).sgn(Q).sgn(P+Q).sgn(P-Q)$

More generally, many prior art phase estimators may be used, to which are added inverter means operating at the symbol rate of the phase estimation signal E (35).

However, it is essential that the estimator supplies a continuous and substantially symmetrical signal, i.e. a signal meeting condition (1). Thus the prior art estimator $E = P.sgn(Q) - Q.sgn(P)$, although particularly simple, is not compatible with the invention because it does not meet condition (1).

The polarity inversion signal 48 may be produced in various ways, for example by a clock internal to the demodulator.

However, it is particularly advantageous to derive this signal 48 from the symbol clock Hs, for reasons concerned with the reliability of the estimation and with hardware simplicity. The signal 48 can be derived from the signal Hs by a simple frequency divider 36 which divides by 2, for example.

The symbol clock Hs is always available in the receiver. It can be obtained from the timing recovery system, for example, and this is no problem because the timing is recovered before the carrier.

The polarity inversion means may comprise a simple analog or digital multiplier to multiply the phase estimation signal E (35) by the signal 48.

Figure 3:
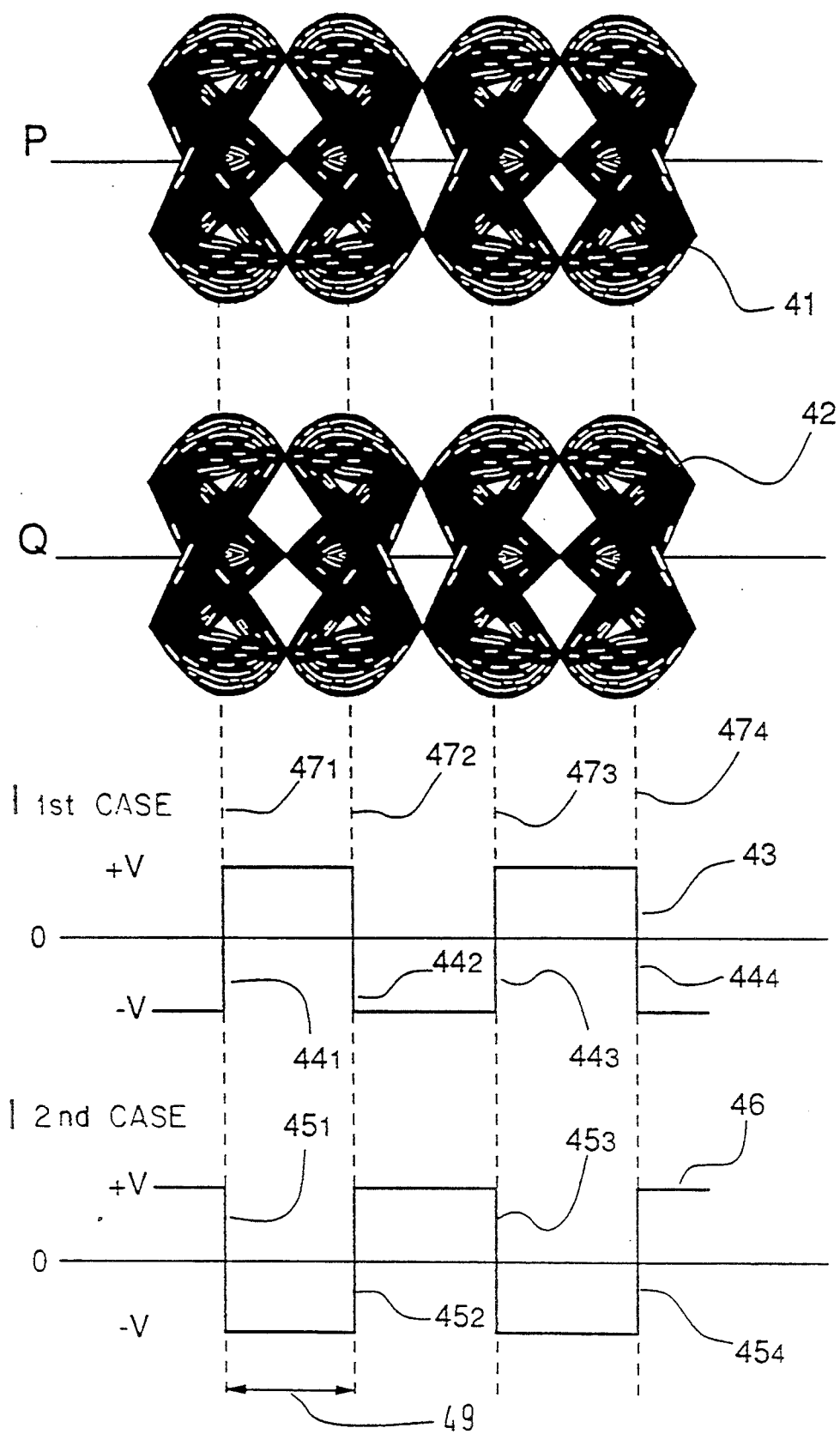
FIG. 3 shows the eye pattern of signals received with modulation as shown in FIGS. 1A through 1C and two respective polarity inversion signals.

FIG. 3 shows a modulated signal of this kind and two respective inversion signals. To be more precise, the curves 41 and 42 show two eye patterns respective to the modulated signals 22' and 23'. The curves 43 and 46 show two possible polarity inversion signals 48.

Note that the rising edges $44_1$, $44_3$ and $45_2$, $45_4$ and the falling edges $44_2$, $44_4$, $45_1$, $45_3$ are exactly located at the transitions $47_1$ through $47_4$ between two consecutive symbols.

When the eye of the signals 41 and 42 is open, the signal 48 therefore remains constant for a duration 49 equal to the duration of a symbol.

Note that the inversion signals 43 and 46 are equivalent from the point of view of the estimator. Either may be used as the signal 48. There is therefore no problem with initializing demodulation. In one case the demodulated signal constellation rotates $\pi/4$ before reaching an equilibrium position. Also, any phase ambiguity which is a multiple of $\pi/4$ relative to the transmitted signal is of no consequence because of the differential encoding of the constellation on transmission.

The device described hereinabove has the advantage of preserving the ruggedness of conventional Costas loop devices. Among other things, this means that it may be applied to any digital bit rate category.

Also, its particularly simple implementation makes it an attractive solution.

I claim:

1. Device for demodulating a received signal (21; 41, 42) at a carrier frequency modulated on two axes in phase quadrature using a $\pi/4$-QPSK type digital modulation technique employing two modulation constellations with four alternately selected and relatively shifted phase states, of the type comprising:
    a voltage-controlled oscillator (28) supplying a local signal substantially at said carrier frequency,
    demodulator means using said local signal and supplying, after filtering (30, 31), the phase component P (22') and quadrature component Q (23') of the demodulated received signal,
    phase control means (32) producing a control signal (39) for controlling said oscillator (28) and including a phase estimator (33) producing a phase estimation signal E (35) satisfying substantially the condition:

$$S(\phi+\pi/4)=-E(\phi)$$

where:

$$\cos\phi = \frac{P}{\sqrt{P^2 + Q^2}} \text{ and } \sin\phi = \frac{Q}{\sqrt{P^2 + Q^2}}$$

and involved in control of the oscillator (28), said phase estimation signal E (35) being derived from said phase component P (22') and quadrature component Q (23') of the demodulated received signal, characterized in that said phase control means (32) comprise means (34) for alternately inverting the polarity of said phase estimation signal E (35), at the rate at which said constellations alternate to supply said control signal (39) for controlling said oscillator (28) after loop-filtering.

2. Device according to claim 1 characterized in that said means (34) for alternately inverting the polarity of said phase estimation signal E (35) at the rate at which said constellations alternate are controlled by a polarity inversion signal I (48) whose sign is alternately positive and negative, each transition ($44_1$ through $44_4$, $45_1$ through $45_4$) of said inversion signal (43, 46; 48) being in substantially corresponding relationship to a transition ($47_1$ through $47_4$) between two consecutive symbols of said digital signal (41, 42).

3. Device according to claim 2 characterized in that said polarity inversion signal I (48) is obtained by halving (33) the frequency of a clock signal (Hs) at the symbol frequency of said digital signal.

4. Device according to claim 1 characterized in that said means (34) for alternately inverting the polarity of the phase estimation signal E (35) comprise a multiplier receiving said polarity inversion signal I (48) and said phase estimation signal E (35).

5. Device according to claim 1 characterized in that said phase estimator (33) supplies a phase estimation signal E (35) as follows:

$$E=(P).(Q).(P+Q).(P-Q).$$

6. Device according to claim 1 characterized in that said phase estimator (33) supplies a phase estimation signal E (35) as follows:

$$E=sgn(P).sgn(Q).sgn(P+Q).sgn(P-Q)$$

where sgn(.) is an operator providing the sign of the signal (.) in question.

* * * * *